(12) United States Patent
Ji et al.

(10) Patent No.: US 9,802,147 B2
(45) Date of Patent: Oct. 31, 2017

(54) FILTER TUBE FOR HIGH TEMPERATURE GAS-SOLID SEPARATION

(71) Applicant: China University of Petroleum-Beijing (CUPB), Beijing (CN)

(72) Inventors: Zhongli Ji, Beijing (CN); Xiaolin Wu, Beijing (CN); Honghai Chen, Beijing (CN); Liang Yang, Beijing (CN); Zhiyi Xiong, Beijng (CN)

(73) Assignee: CHINA UNIVERSITY OF PETROLEUM—BEIJING, Beijing (CN)

( * ) Notice: Subject to any disclaimer, the term of this patent is extended or adjusted under 35 U.S.C. 154(b) by 441 days.

(21) Appl. No.: 14/397,792

(22) PCT Filed: Jan. 18, 2013

(86) PCT No.: PCT/CN2013/070709
§ 371 (c)(1),
(2) Date: Feb. 13, 2015

(87) PCT Pub. No.: WO2014/086108
PCT Pub. Date: Jun. 12, 2014

(65) Prior Publication Data
US 2015/0182897 A1    Jul. 2, 2015

(30) Foreign Application Priority Data

Dec. 5, 2012  (CN) .......................... 2012 1 0517544

(51) Int. Cl.
*B01D 46/00* (2006.01)
*B01D 46/24* (2006.01)
*B01D 46/54* (2006.01)

(52) U.S. Cl.
CPC ..... *B01D 46/0068* (2013.01); *B01D 46/0005* (2013.01); *B01D 46/0021* (2013.01);
(Continued)

(58) Field of Classification Search
CPC  B01D 46/00; B01D 46/0005; B01D 46/0021; B01D 46/0046; B01D 46/0068;
(Continued)

(56) References Cited

U.S. PATENT DOCUMENTS

| | | | |
|---|---|---|---|
| 4,133,657 A | 1/1979 | Krogsrud | |
| 4,860,038 A * | 8/1989 | Thatcher | G02B 23/22 348/81 |

FOREIGN PATENT DOCUMENTS

| | | |
|---|---|---|
| CN | 2297238 Y | 11/1998 |
| CN | 102728161 A | 10/2012 |

(Continued)

OTHER PUBLICATIONS

Chinese Search Report from corresponding Chinese Patent Application No. 201210517544.6 dated Jul. 4, 2014, 6 pages.
(Continued)

*Primary Examiner* — T. Bennett McKenzie

(57) ABSTRACT

A filter tube for high temperature gas-solid separation is provided that has a first cylinder and a second cylinder coaxially nested in the first cylinder with the first cylinder arranged so that an opening thereof faces upward, a first connection flange provided at a periphery of the opening of the first cylinder, and a circular through-hole provided at a bottom of the first cylinder. The second cylinder is nested in the first cylinder so that an opening of the second cylinder faces downward. The second cylinder has an end at an opening thereof that is hermetically connected to the circular through-hole of the first cylinder. The second cylinder has a bottom, and the bottom of the second cylinder and the opening of the first cylinder are at the same horizontal level. An annular gas passage is formed between the first cylinder and the second cylinder.

12 Claims, 7 Drawing Sheets

(52) U.S. Cl.
CPC ..... *B01D 46/0046* (2013.01); *B01D 46/2407* (2013.01); *B01D 46/543* (2013.01); *B01D 2273/20* (2013.01)

(58) Field of Classification Search
CPC .............. B01D 46/2407; B01D 46/543; B01D 2273/20
USPC .................................................. 55/282–305
See application file for complete search history.

(56) References Cited

FOREIGN PATENT DOCUMENTS

| | | |
|---|---|---|
| CN | 102728162 A | 10/2012 |
| CN | 202983425 U | 6/2013 |

OTHER PUBLICATIONS

Chinese First Office Action from corresponding Chinese Patent Application No. 201210517544.6 dated Aug. 28, 2013, 7 pages.
Chinese Second Office Action from corresponding Chinese Patent Application No. 201210517544.6 dated Dec. 5, 2013, 5 pages.

\* cited by examiner

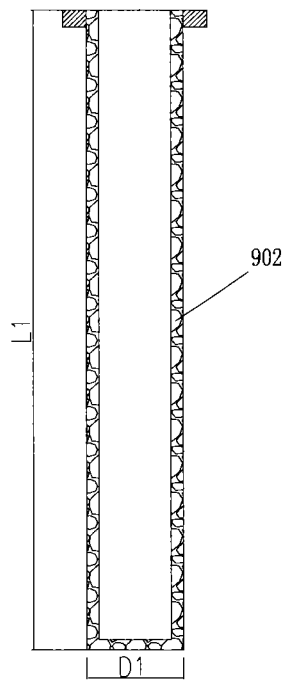
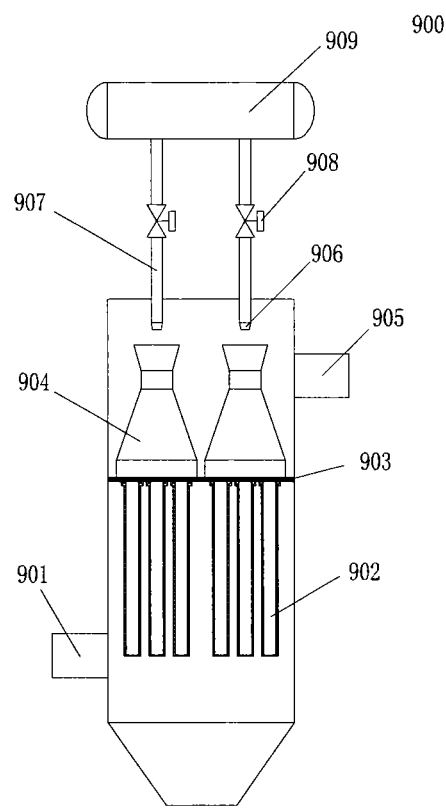
Fig. 8A  Fig. 8B
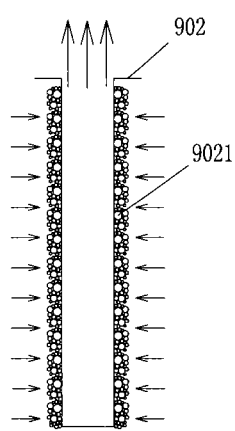
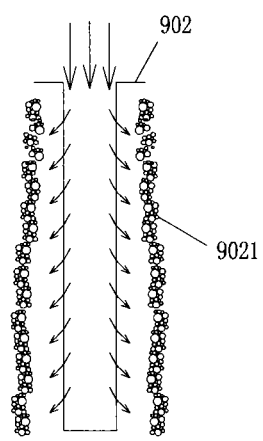
Fig. 8C  Fig. 8D

FILTER TUBE FOR HIGH TEMPERATURE GAS-SOLID SEPARATION

CROSS-REFERENCE TO RELATED APPLICATIONS

This application is a continuation of International Application No. PCT/CN2013/070709, filed on Jan. 18, 2013, which claims priority to Chinese Patent Application No. 201210517544.6, filed on Dec. 5, 2012, both of which are hereby incorporated by reference in their entireties.

FIELD OF THE INVENTION

The present invention relates to a gas-solid separation element and device, and particularly, to a sintered metal filter tube and its filtration device.

BACKGROUND OF THE INVENTION

In the chemical industry, petroleum, metallurgy and electricity, high temperature dusty gases are usually generated. Since various processes need to recover the energy and reach the environmental protection discharge standard, dust removal shall be done to the high temperature dusty gases. The high temperature dust removal is a technology that directly performs a gas-solid separation under high temperature to purify the gas, which can furthest utilize the sensible physical heat, the potential chemical heat and the kinetic force of the gas and improve the energy utilization rate, while simplifying the technological processes and saving the device investment.

The device usually used for the high temperature gas-solid separation is a gas filter, and the filter tube is the core element of the gas filter. The sintered metal filter tube has good performances in anti-seismic, the high-temperature resistance, the corrosion resistance and thermal impact, and also has high filtration precision and filtration efficiency, thus it is widely used in the field of high temperature gas purification.

As illustrated in FIG. 8A, which is a sintered metal filter tube 902 used in the prior art. The filter tube 902 is a cylinder with one end opened, and the other end closed. The opening end is provided with a flange to be fixed on the tube sheet of the filter.

As illustrated in FIG. 8B, which is a structure diagram of an existed filter 900, wherein a tube sheet 903 of the existed filter 900 hermetically divides the filter into two parts: an upper clean gas side and a lower dusty gas side. The dusty gas (also referred to as coarse synthesis gas) enters the lower dusty gas side of the filter from a gas inlet 901 of the filter 900, and reaches each filtration unit under the gas driving force. During the filtration process, the dusty gas enters the filter tube under the effect of a pressure difference from an outer surface of the filter tube 902 through the pores in the filtration material. The solid particles in the gas are intercepted on the outer wall of the filter tube 902 to form a pressed powder layer 9021 (see FIG. 8C). The clean gas is discharged from the opening end of the filter tube to enter the clean gas side, and then discharged via the gas outlet 905 for subsequent process. Along with the filtration operation, the pressed powder layer 9021 on the outer surface of the filter tube 902 gradually become thicker, thus the pressure drop of the filter 900 increases. In that case, pulse-jet cleaning shall be adopted to reproduce the performance of the filter tube. When dust removal is carried out through pulse-jet cleaning, a pulse-jet valve 908 normally closed is opened, and the high-pressure nitrogen or clean synthesis gas instantaneously enters a pulse jet pipeline 907; next, the high-pressure and high-speed pulse-jet gas is ejected into the corresponding ejector 904 through a nozzle 906 in the pipeline; the pulse-jet gas enters the corresponding filter tube 902, and peels off the pressed powder layer 9021 on the outer surface of the filter tube 902 using the transient energy (see FIG. 8D), so that the resistance of the filter tube substantially recovers to the initial state, thereby realizing the performance reproduction of the filter tube.

The support (or referred to as framework) of the existed filter tube is made of sintered metal powder or sintered metal fiber material. The filter tube has a height L1 and an outer diameter D1 (see FIG. 8A), which performs a filtration through the micro-pores of the filter tube, and realizes the performance regeneration in a manner of pulse-jet.

However, the filter tube used by the prior art at least has the following defects:

(1) The filtration area of the single filter tube is limited, and the filtration capacity of the whole filter is small.

The filtration area of the single filter tube means an outer surface area of the filter tube. In a large-scale gas filter, usually several hundreds to more than ten hundreds of filter tubes are mounted. When the amount of treated process gas increases, the number of required filter tubes increases, the volume of the filter becomes huger, and the production cost and the maintenance fee of the whole device are very high.

(2) The pulse-jet process causes serious "backflow".

Studies show that when the pulse-jet is going to be ended, the speed of the pulse-jet gas gradually decreases. In this process, the pressure in the filter tube is smaller than the pressure outside. The gas near the outer wall of the filter tube flows back from the outside of the tube to the inside of the tube through the tube wall, and the solid particles blown off from the outer wall of the filter tube again deposit on the outer wall. This "backflow" phenomenon even causes some tiny particles to be embedded into the tube wall, and the porous passage of the filter tube may easily be blocked, thus the service life of the filter tube is reduced.

(3) The outer surface of the support is the filtration surface. In the filtration process, the tiny particles in the dusty gas may easily deposit inside the support. Since the porous passage of the filter tube is an irregular labyrinth, the pulse-jet operation is also difficult to blow out the deposited dust, thus the pores of the filter tube may be blocked and invalid.

(4) Studies show that when dust removal is performed for the filter tube through pulse-jet, since the opening at the top of the filter tube form an ejector structure together with the pulse jet gas flow, the high-pressure and high-speed pulse-jet gas flow may eject clean gas into the filter tube from the vicinity of the opening of the filter tube, and a "negative pressure region" may easily occur near the opening. The negative pressure region causes the dust outside the filter tube to be entrained onto the surface of the filter tube. The region is corresponding to the dust removal dead zone, and the dust removal cannot be achieved.

Therefore, by virtue of the experiences and practices of many years in related industries, the inventor proposes a filter tube for high temperature gas-solid separation and its filtration device, so as to overcome the defects of the prior art.

SUMMARY OF THE INVENTION

The object of the present invention is to provide a filter tube for high temperature gas-solid separation and its filtration device, so as to increase the filtration areas of the single filter tube and the whole filter, improve the effect of dust removal, and reduce the production cost and the maintenance fee of the whole filtration device.

Another object of the present invention is to provide a filter tube for high temperature gas-solid separation and its filtration device, wherein a pulse-jet cleaning is performed for the filter tube in a manner of rotational flow, so as to effectively improve the regeneration efficiency, and also solve the problems of "backflow" and "negative pressure region".

The object of the present invention is realized by a filter tube for high temperature gas-solid separation, the filter tube comprises a first cylinder and a second cylinder coaxially nested in the first cylinder, the first cylinder is arranged such that an opening thereof faces upward, a first connection flange is provided at a periphery of the opening of the first cylinder, and a circular through-hole is provided at a bottom of the first cylinder; the second cylinder is nested in the first cylinder such that an opening of the second cylinder faces downward; an end at the opening of the second cylinder is hermetically connected to the circular through-hole of the first cylinder; a bottom of the second cylinder and the opening of the first cylinder are at the same horizontal level; and an annular gas passage is formed between the first cylinder and the second cylinder.

In a preferred embodiment of the present invention, a pulse-jet guiding device is securely provided on a top end of the filter tube; the pulse-jet guiding device comprises an outer cylinder with both ends thereof being penetrated through, and a guiding cone secured in the outer cylinder; an inner diameter of the outer cylinder is the same as an inner diameter of the first cylinder of the filter tube, and a second connection flange connected to the first connection flange of the filter tube is provided at a bottom end of the outer cylinder; the guiding cone comprises a guiding cone body and a plurality of spiral blades provided around the guiding cone body along a circumferential direction; the guiding cone body has a big end down streamline shape, a bottom of the guiding cone body is planar and securely disposed on a top end of the second cylinder, and a diameter of the bottom of the guiding cone body is the same as an outer diameter of the second cylinder of the filter tube; outer sides of the plurality of spiral blades are securely connected to an inner wall of the outer cylinder.

In a preferred embodiment of the present invention, an angle between a tangential line at an uppermost end of each spiral blade and a horizontal line is 90°; and an angle between a tangential line at a lowest end of each spiral blade and the horizontal line is 0°~45°.

In a preferred embodiment of the present invention, an outer layer filtration membrane is provided on an outer wall of the first cylinder, and an inner layer filtration membrane is provided on an inner wall of the second cylinder; the outer layer filtration membrane having a thickness larger than that of the inner layer filtration membrane.

In a preferred embodiment of the present invention, the filter tube is a sintered metal filter tube.

The object of the present invention is also realized by a filter for high temperature gas-solid separation, the filter tube comprises a first cylinder and a second cylinder coaxially nested in the first cylinder, the first cylinder is arranged such that an opening thereof faces upward, a first connection flange is provided at a periphery of the opening of the first cylinder, and a circular through-hole is provided at a bottom of the first cylinder; the second cylinder is nested in the first cylinder such that an opening of the second cylinder faces downward; an end at the opening of the second cylinder is hermetically connected to the circular through-hole of the first cylinder; a bottom of the second cylinder and the opening of the first cylinder are at the same horizontal level; and an annular gas passage is formed between the first cylinder and the second cylinder.

In a preferred embodiment of the present invention, a pulse jet guiding device is securely provided on a top end of the filter tube; the pulse-jet guiding device comprises an outer cylinder with both ends thereof being penetrated through, and a guiding cone secured in the outer cylinder; an inner diameter of the outer cylinder is the same as an inner diameter of the first cylinder of the filter tube, and a second connection flange connected to the first connection flange of the filter tube is provided at a bottom end of the outer cylinder; the guiding cone comprises a guiding cone body and a plurality of spiral blades provided around the guiding cone body along a circumferential direction; the guiding cone body has a big end down streamline shape, a bottom of the guiding cone body is planar and securely disposed on a top end of the second cylinder, and a diameter of the bottom of the guiding cone body is the same as an outer diameter of the second cylinder of the filter tube; outer sides of the plurality of spiral blades are securely connected to an inner wall of the outer cylinder.

In a preferred embodiment of the present invention, an angle between a tangential line at an uppermost end of each spiral blade and a horizontal line is 90°; and an angle between a tangential line at a lowest end of each spiral blade and the horizontal line is 0°~45°.

In a preferred embodiment of the present invention, an outer layer filtration membrane is provided on an outer wall of the first cylinder, and an inner layer filtration membrane is provided on an inner wall of the second cylinder; the outer layer filtration membrane having a thickness larger than that of the inner layer filtration membrane.

In a preferred embodiment of the present invention, the filter tube is a sintered metal filter tube.

As can be seen from the above, the filter tube for high temperature gas-solid separation and the filter thereof can increase the filtration areas of the single filter tube and the whole filter, improve the dust removal effect, and reduce the production cost and the maintenance fee of the whole filtration device; meanwhile, they can effectively improve the regeneration efficiency, solve the problems of "backflow" and "negative pressure region", and prolong the service life of the filter tube.

BRIEF DESCRIPTION OF THE DRAWINGS

The following accompanied drawings only intend to exemplarily describe and explain the present invention, rather than limiting the scope of the present invention. In which.

FIG. 8A is a structure diagram of a filter tube used in the prior art;

FIG. 8B is a structure diagram of an existed filter;

FIG. 8C is a filtration process diagram of a filter tube in the prior art; and

FIG. 8D is a pulse-jet process diagram of a filter tube in the prior art.

DETAILED DESCRIPTION OF THE PREFERRED EMBODIMENTS

In order to understand the technical features, objects and effects of the present invention more clearly, the embodiments of the present invention are described with reference to the accompanied drawings.

Figure 1:
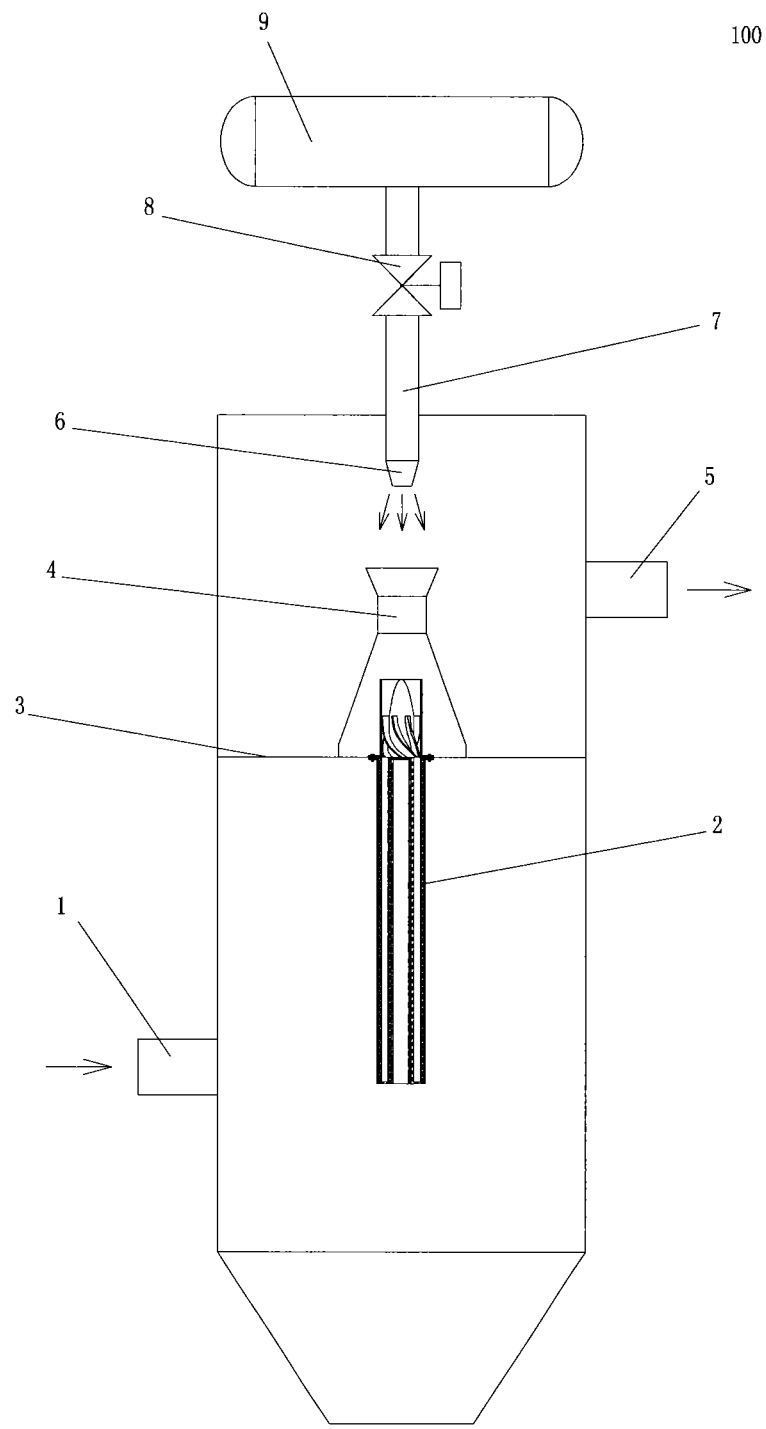
FIG. 1 is a structure diagram of a filter according to the present invention.
Figure 2A:
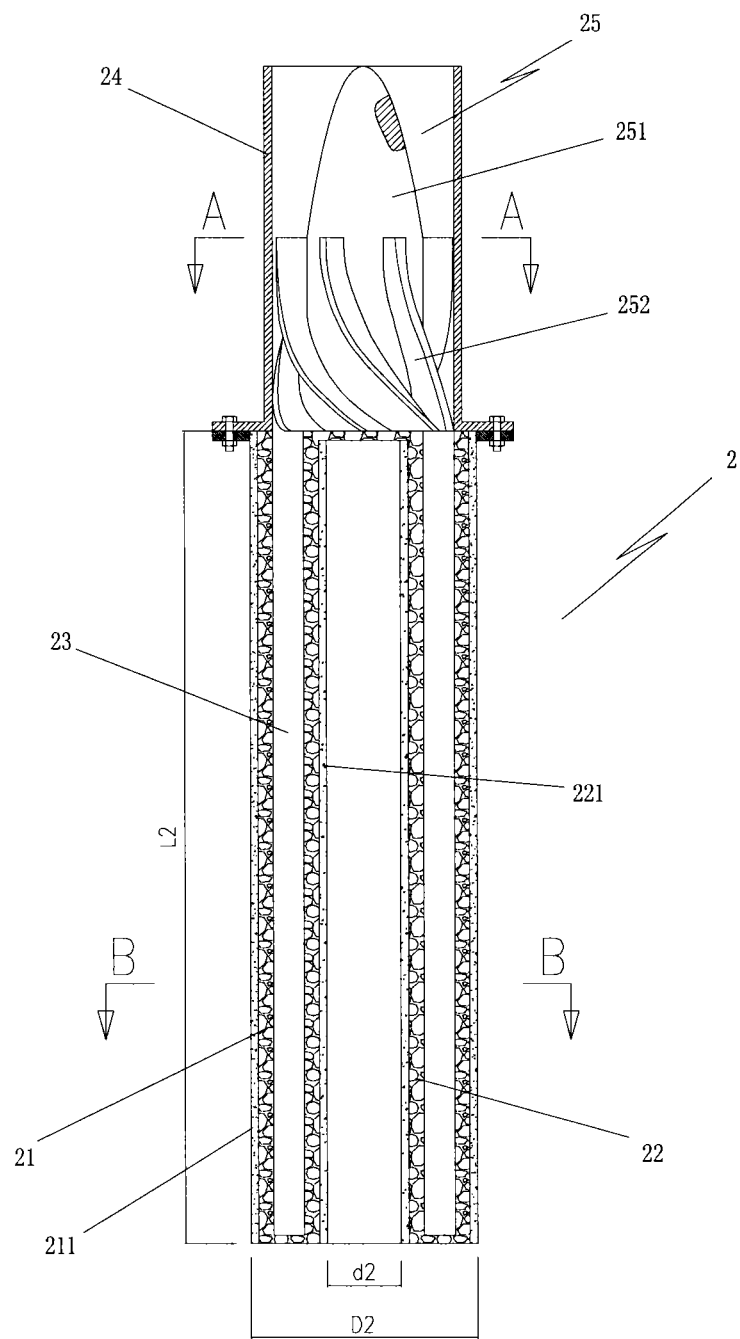
FIG. 2A is a structure diagram of a filter tube according to the present invention.
Figure 2B:
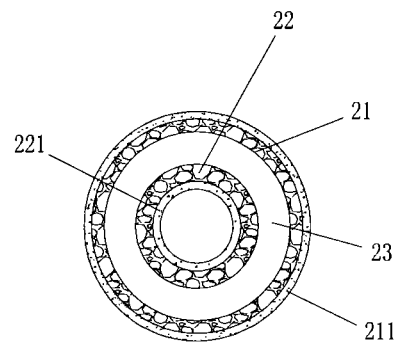
FIG. 2B is a structure diagram of B-B cross-section in FIG. 2A.
Figure 2C:
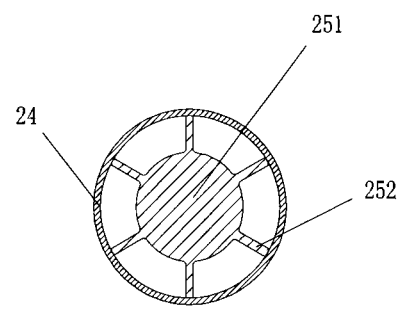
FIG. 2C is a structure diagram of A-A cross-section in FIG. 2A.
Figure 2D:
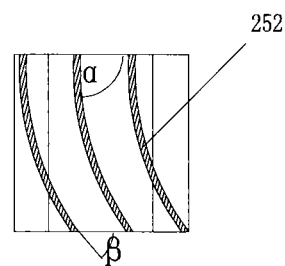
FIG. 2D is a structure diagram of blades arranged spirally in FIG. 2A.

As illustrated in FIG. 1, the present invention proposes a filter 100 for high temperature gas-solid separation, a tube sheet 3 of the filter is provided with a filtration unit which includes at least one filter tube 2, and the tube sheet 3 hermetically divides the filter into an upper clean gas chamber and a lower dusty gas chamber; an ejector 4 and a pulse-jet pipeline 7 corresponding to the ejector 4 are provided above the filtration unit, one end of the pulse-jet pipeline 7 is communicated with a pulse-jet gas tank 9 through a pulse-jet valve 8, the other end of the pulse-jet pipeline 7 is provided with a nozzle 6 opposite to the top of the ejector 4, the dusty gas chamber is provided with a gas inlet 1, and the clean gas chamber is provided with a gas outlet 5; as illustrated in FIGS. 2A and 2B, the filter tube 2 of the present invention is a sintered metal filter tube; the filter tube 2 comprises a first cylinder 21 and a second cylinder 22 coaxially nested in the first cylinder 21; the first cylinder 21 is arranged such that an opening thereof faces upward, a periphery of the opening of the first cylinder 21 is provided with a first connection flange connected to the tube sheet 3, and a center of the bottom of the first cylinder 21 is provided with a circular through-hole; the second cylinder 22 is nested in the first cylinder 21 such that its opening faces downward; an end at the opening of the second cylinder 22 is hermetically connected to the circular through-hole of the first cylinder 21; the bottom of the second cylinder 22 and the opening of the first cylinder 21 are at the same horizontal level (i.e., the first cylinder 21 and the second cylinder 22 have the same height); an annular gas passage 23 is formed between the first cylinder 21 and the second cylinder 22; further, as illustrated in FIGS. 2A, 2C and 2D, in this embodiment, a pulse-jet guiding device is securely provided at the top of the filter tube 2; the pulse-jet guiding device includes an outer cylinder 24 with both ends thereof being penetrated through, and a guiding cone 25 secured in the outer cylinder 24; the inner diameter of the outer cylinder 24 is the same as the inner diameter of the first cylinder 21 of the filter tube, and the bottom of the outer cylinder 24 is provided with a second connection flange connected to the first connection flange of the filter tube; the outer cylinder 24 is used to concentrate the pulse jet gas so that it enters the filter tube; the guiding cone 25 includes a guiding cone body 251 and a plurality of spiral blades 252 uniformly provided around the guiding cone body 251 in the circumferential direction; the guiding cone body 251 has a big end down streamline shape (e.g., bullet shape), which facilitates guiding the pulse-jet gas stream into the filter tube; the bottom of the guiding cone body 251 is planar and securely provided on the top of the second cylinder 22, so as to prevent the pulse-jet gas from directly acting on the weak position of the top of the filter tube (i.e., the top of the second cylinder 22) and causing a strike on the filter tube; the bottom diameter of the guiding cone body 251 is the same as the outer diameter of the second cylinder 22 of the filter tube; the outer sides of the plurality of spiral blades 252 are securely connected to the inner wall of the outer cylinder 24 (in a tangential connection); thus the flow-through region of the blades 252 is just axially and oppositely overlapped with the annular gas passage 23 of the filter tube, so that the filtered gas and the pulse-jet gas can pass the flow-through region of the blades.

Figure 3:
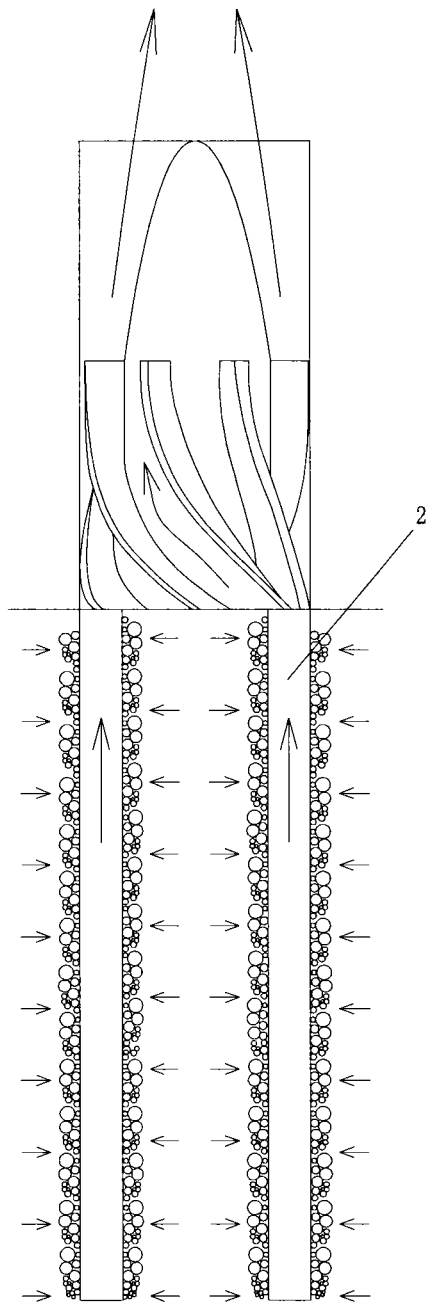
FIG. 3 is a filtration process diagram of a filter tube according to the present invention.
Figure 4:
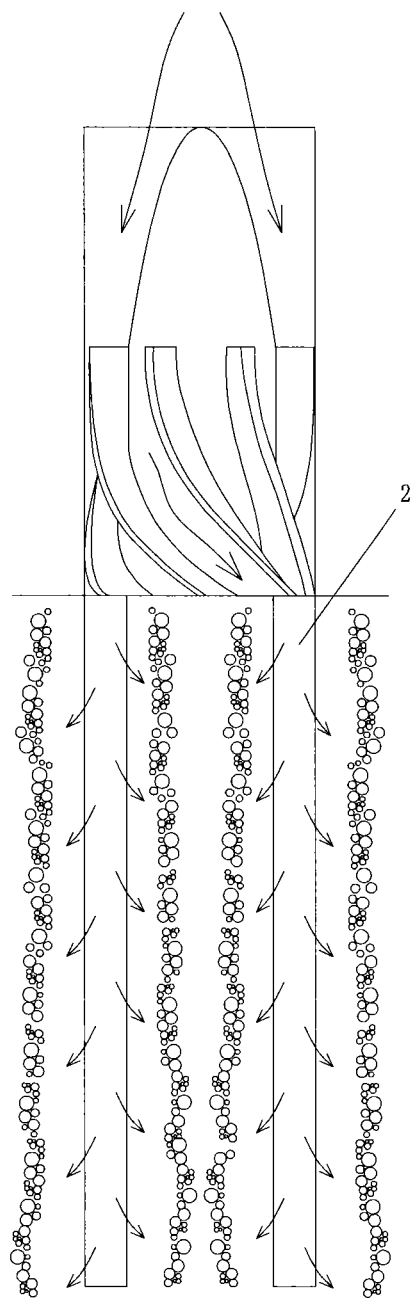
FIG. 4 is a pulse-jet process diagram of a filter tube according to the present invention.

When the filter of the present invention is used for dust removal, the dusty gas enters the dusty gas chamber of the filter from the gas inlet 1 of the filter, and arrives at the filtration unit under the gas driving force; the dusty gas enters the annular gas passage 23 from an inner layer filtration surface (the inner wall surface of the second cylinder 22) and an outer layer filtration surface (the outer wall surface of the first cylinder 21) at the two sides of the annular gas passage 23 of the filter tube 2, respectively; the dust particles are intercepted on the inner layer filtration surface and the outer layer filtration surface to form pressed powder layers (see FIG. 3); the filtered gas is the clean gas, which flows to the clean gas side of the filter in an arrow direction shown in FIG. 3, flows out of the gas outlet 5 and undergoes the subsequent process. When dust removal is carried out through pulse-jet, the pulse-jet valve 8 on the pulse-jet pipeline 7 is instantaneously opened; after arriving at the position of the guiding cone, the pulse-jet gas is guided into the blade channel by the guiding cone; after passing through the blade, the high speed pulse jet gas is rotated, and enters the annular gas passage 23 of the filter tube in the form of a rotational flow; the rotating gas flow forms a vortex in the internal space of the filter tube to transfer energy from above to below, thereby peeling off the dust layers on the inner layer filtration surface and the outer layer filtration surface of the filter tube, and reproducing the performance of the filter tube (see FIG. 4).

As can be seen from the above description, the filter tube of the present invention can obviously increase the filtration area of a single filter tube by 1.5 to 2 times of the filtration area of the existed filter tube; when the number of filter tubes and the operation conditions are maintained in the filter, the filtration load of the filter can be greatly improved by mounting the filter tubes of the present invention; and if the filtration load of the filter is maintained, the number of filter tubes can be decreased by using the filter tubes of the present invention, thereby reducing the filter size, the production cost and the maintenance fee.

The above effects of the present invention are further described as follows through a comparison with the prior art:

the filtration area S of a single filter tube: the outer surface area of the filter tube, and the filtration surface is a rectangle after being developed;

the filtration area $S1$ of the filter tube in the prior art (see FIG. 8A):

$$S1 = \pi * D1 * L1;$$

the filtration area $S2$ of the filter tube of the present invention (see FIG. 2A):

$$S2 = \pi * D2 * L2 + \pi * d2 * L2 = \pi * (D2 + d2) * L2;$$

when two filter tubes have an equal length L, a ratio between the filtration areas of the two filter tube is:

$$S2/S1=(D2+d2)/D1;$$

Under the same operation conditions, the filtration capacity of the filter tube increases with the expansion of the filtration area;

the volume V of a single filter tube: the cavity volume of the gas passage of the filter tube (since the support of the filter tube has a thin thickness of about 2 to 4 mm, the thickness of the support may be omitted during the calculation);

regarding the filter tube in the prior art: $V1=\frac{1}{4}*\pi*D1^2*L1$ (volume of the cylinder);

regarding the filter tube of the present invention: $V2=\frac{1}{4}*\pi*(D2^2-d2^2)*L2$ (volume of the cylindrical ring);

assuming that V1=V2, and the two filter tubes have the equal length L, the following equation can be obtained:

$$D1^2=D2^2-d2^2;$$

when the two filter tubes have the same volume and length, we compare the filtration areas of them, and further check the filtration capacity of the whole filter.

Descriptions are now given by taking the industrial filter in practice as an example.

Figure 5:
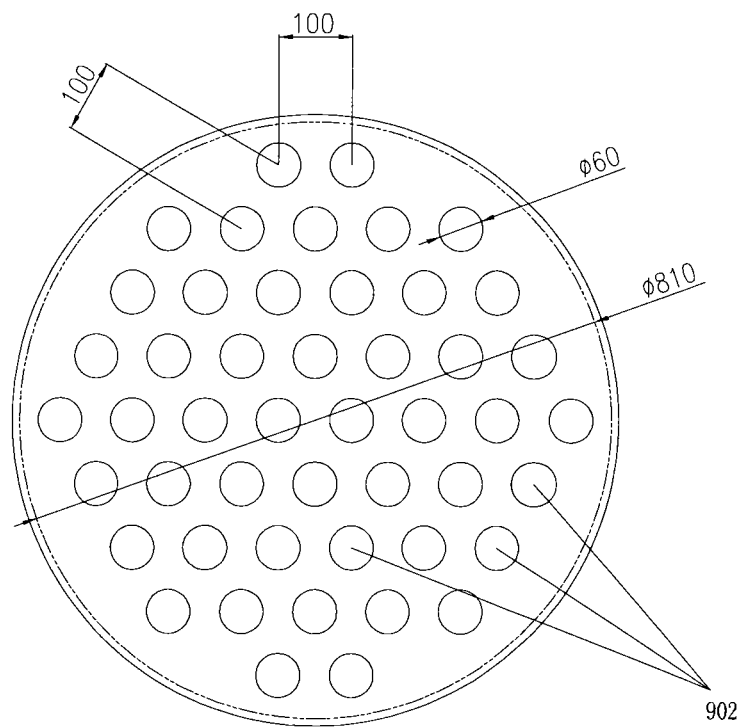
FIG. 5 is a structure diagram of an arrangement of filter tubes in a filtration unit in the prior art.

The filter tube used in the prior art has an outer diameter D1=60 mm and a length L1=1500 mm; 1152 filter tubes are mounted in the filter and divided into 24 filtration units; in each filtration unit, 48 filter tubes are mounted and arranged at equilateral triangles; the ejector has a diameter of 810 mm (i.e., the circular region where each filtration unit is located has a diameter of 810 mm), and the distance between the centers of any two adjacent filter tubes is 100 mm (i.e., the distance between the outer wall surfaces of the two adjacent filter tubes is 40 mm, in order to reserve a space for the dust layer during the filtration, and prevent the occurrence of a dust bridge between the adjacent filter tubes when the dust layer is too thick); FIG. 5 illustrates an arrangement diagram of filter tubes in one filtration unit in the prior art.

In the filter tube of the present invention, d2=40 mm (i.e., the distance between the outer wall surfaces in the prior art is 40 mm), which is substituted into the equation $D1^2=D2^2-d2^2$ to obtain D2=72.11 mm; taking the integer 72 mm, then the area ratio of a single filter tube is S2/S1=(D2+d2)/D1=1.868, i.e., the outer surface area of the filter tube of the present invention is increased by 86.8% than the prior art. In order to compare the conditions in the whole filtration unit more objectively, assuming that the distance between the outer wall surfaces of the two adjacent filter tubes of the present invention is 40 mm, then the distance between the centers of the two adjacent filter tubes is 72+40=112 mm. When the filter tubes are arranged in the filtration unit according to the prior art (i.e., arranged at equilateral triangles), two arrangement results can be obtained: one is that 38 filter tubes are arranged (see FIG. 6), the other is that 42 filter tubes are arranged (see FIG. 7). That is, in the existed filtration unit, 38~42 filter tubes of the present invention can be arranged. Since the outer surface area of the single filter tube of the present invention is 1.868 times of the prior art, and the total filtration area of the filtration unit is 1.478~1.635 times of the prior art, the filtration capacity of the whole filter can be improved by 48%-64% than the prior art by using the filter tubes of the present invention.

In addition, owing to the specific structure of the filter tube proposed in the present invention, the filter performs a pulse-jet cleaning for the filter tubes in a manner of rotational flow, which effectively improves the regeneration efficiency, and also solves the problems of "backflow" and "negative pressure region".

The top of the filter tube of the present invention is provided with a pulse-jet guiding device, wherein a plurality of spiral blades are provided outside the guiding cone body, and the gas flow from the lower end of the guiding blade to the upper end thereof is a reverse flow; after the pulse-jet is finished, the gas near the outer wall of the filter tube flows back at a high rate; the blade where the reverse flow occurs increases the flow resistance to the gas, and hinders the flow back process of the gas, thereby preventing the small particles outside the filter tube from depositing again on the outer wall surface of the filter tube or embedded into the filter tube due to the flow back effect, when the dust removal is going to be completed (to be noted, in the actual filtration process, the gas speed is very low (about 3~7 m/s), and since the filtration speed is low, the filtration resistance caused by the reverse flow of the blade almost can be omitted; while the flow back speed is very high (about 70~150 m/s), thus an obvious suppression can be achieved).

Figure 6:
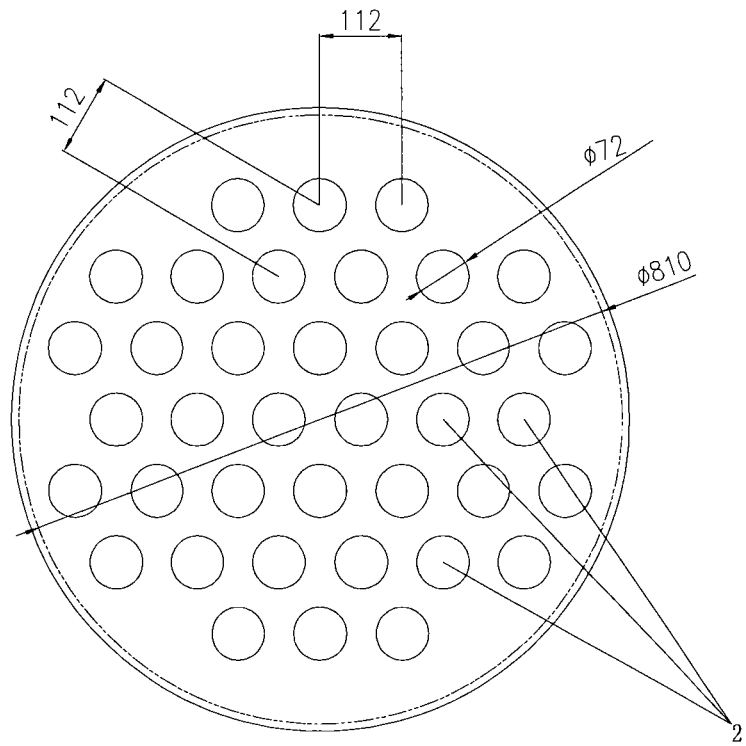
FIG. 6 is structure diagram 1 of an arrangement of filter tubes in a filtration unit according to the present invention.
Figure 7:
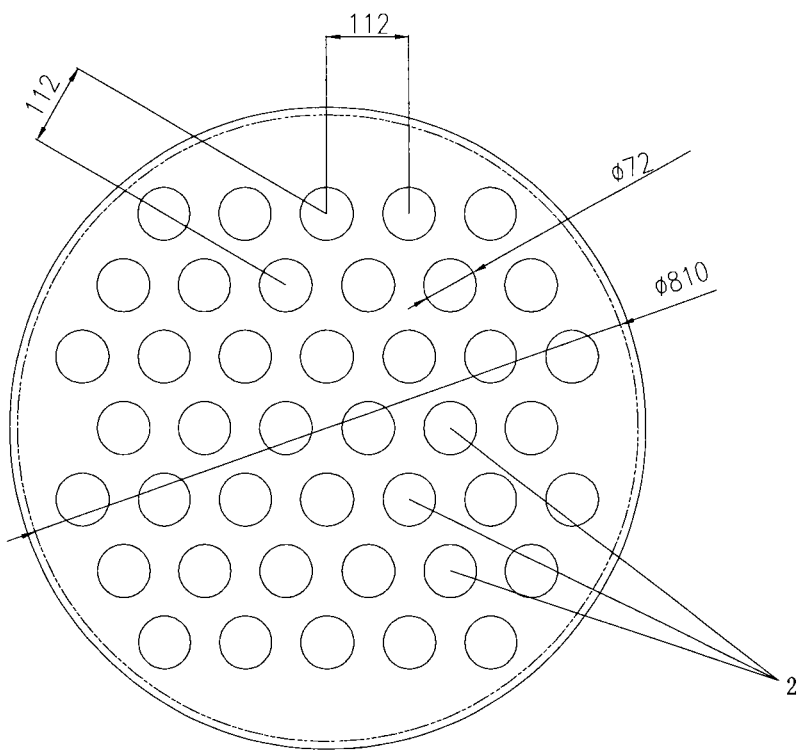
FIG. 7 is structure diagram 2 of an arrangement of filter tubes in a filtration unit according to the present invention.

In the present invention, 3~9 spiral blades 252 may be provided outside the guiding cone body 251; as illustrated in FIG. 2C, 6 blades are provided in this embodiment; as illustrated in FIG. 2D, an angle α between the tangential line at the uppermost end of each blade 252 and the horizontal line is 90°; and an angle β between the tangential line at the lowest end of each blade 252 and the horizontal line is 0°~45°. The value of angle β is matched with the length of the filter tube and the pulse-jet parameters. If the filter tube is long, the pulse-jet pressure can be increased appropriately, and a small angle such as 10° may be used, so that the rotation length of the pulse jet gas is increased when the pulse-jet gas flow enters the annular gas passage in the filter tube, and the dust removal energy sufficiently reaches the bottom of the filter tube; if the filter tube is short, a small pulse-jet pressure can be employed, and a large angle such as 30° may be used, so as to enhance the rotation and achieve a better dust removal effect. Since the rotational gas flow is used for the dust removal operation, no ejection structure will be formed, thereby overcoming the problem of "negative pressure" in the prior art, which is caused in a certain region at the opening of the filter tube by the pulse-jet gas flow axially entering the filter tube.

Further, as illustrated in FIGS. 2A and 2B, in this embodiment, in order to prevent tiny particles (e.g., 1 μm particles) from being embedded into the micro-pores of the filter tube in the dust removal filtration operation, improve the filtration precision and the filtration efficiency, and prolong the service life of the filter tube, the outer wall of the first cylinder 21 is provided with an outer layer filtration membrane 211, and the inner wall of the second cylinder 22 is provided with an inner layer filtration membrane 221; the material of the outer layer filtration membrane and the inner layer filtration membrane may be selected from any of 316, 316L, Inconel alloy, FeCrAl alloy and HR160, and it may be the same as or different from the material of the support of the filter tube. According to different working condition requirements, the thickness range of the filtration membrane is 100 μm~500 μm, the pore diameter of the filtration membrane is 2~10 μm, and the porosity is 45%~60%.

In this embodiment, the first cylinder and the second cylinder usually have a wall thickness of 2~4 mm. In the filtration process, the outer layer filtration surface has a larger area, and the inner layer filtration surface has a smaller area. Thus in the operation, under the same amount of filtered gas, the filtration rate of the outer layer filtration surface is low (the filtration rate is a ratio of the amount of filtered gas to the filtration area), while the filtration rate of the inner layer filtration surface is high. The resistance of the filter tube rises with the increase of the filtration rate, so the loads borne by the two filtration surfaces are inconsistent with each other. In the present invention, the thickness of the filtration membrane may be controlled to match and adjust the load in the operation process, wherein the filtration resistance rises with the increase of the thickness of the filtration membrane, and vice versa. In this embodiment, the thickness of the outer layer filtration membrane 211 is larger than that of the inner layer filtration membrane 221, thus a design may be made so that the inner layer filtration membrane bears a smaller resistance while the outer layer filtration membrane bears a larger resistance (the thicknesses of the filtration membranes at inner and outer layers may be matched through calculation). In this embodiment, the thickness of the outer layer filtration membrane is larger than that of the inner layer filtration membrane by 20~50%.

The filter tube of the present invention is a sintered metal filter tube, which is processed with the sintered metal fiber or the sintered metal powder, and the material is any of 316, 316L, Inconel alloy, FeCrAl alloy and HR160.

In conclusion, as compared with the prior art, the filter tube and the filter thereof in the present invention at least have the following advantages:

1. The structural design of the filter tube of the present invention can obviously increase the filtration area of the single filter tube, and when it adopts the same design principle as the filter tube in the prior art, the filtration area can be increased by 1.5~2 times than that of the existed filter tube; when the number of filter tubes and the operation conditions are kept unchanged, the processing capacity of the filter can be greatly improved if the filter tubes of the present invention are mounted; and when the processing capacity of the filter is kept unchanged, the number of filter tubes can be decreased by using the filter tubes of the present invention (the industrially applied sintered metal filter tube is expensive, and the unit price is several to more than ten thousands CNY), thereby reducing the filter size, the production cost and the maintenance fee.

2. An energy conversion is made for the axial pulse-jet gas by using the guiding blade, and a pulse-jet cleaning is performed for the filter tube in a manner of rotational flow, thereby effectively improving the regeneration efficiency, and also solving the problems of "backflow" and "negative pressure region" in the prior art.

3. Both the inner layer and the outer layer have a filtration membrane, and the thickness of the filtration membrane can be controlled according to the actual condition for the convenience of adjusting the filtration load matching of the inner layer and the outer layer, thereby improving the filtration efficiency, reducing the penetration of tiny particles and the deposition thereof in the filter tube, and prolonging the service life of the filter tube.

4. As can be seen from the structure of the filter tube of the present invention, the filter tube of the present invention has a higher strength than the filter tube in the prior art, which increases the performances in anti-seismic and thermal impact of the filter tube in the filtration and pulse-jet operation, and prolongs its service life.

The above descriptions are just exemplary embodiments of the present invention, rather than limitations to the scope of the present invention. Any equivalent change and modification made by a person skilled in the art without deviating from the conception and principle of the present invention shall fall within the protection scope of the present invention.

The invention claimed is:

1. A filter tube for high temperature gas-solid separation, the filter tube comprising a first cylinder and a second cylinder coaxially nested in the first cylinder, the first cylinder being arranged so that an opening thereof faces upward, a first connection flange being provided at a periphery of the opening of the first cylinder, and a circular through-hole being provided at a bottom of the first cylinder, wherein the second cylinder is nested in the first cylinder so that an opening at an end of the second cylinder faces downward, wherein the end at the opening of the second cylinder is hermetically connected to the circular through-hole of the first cylinder, wherein the second cylinder has a bottom, and wherein the bottom and the opening of the first cylinder are at the same horizontal level, and an annular gas passage being formed between the first cylinder and the second cylinder, wherein the filter tube has a top end with a pulse-jet guiding device securely provided thereon, the pulse-jet guiding device comprises an outer cylinder with both ends thereof being penetrated through, and a guiding cone secured in the outer cylinder, the outer cylinder has an inner diameter that is the same as an inner diameter of the first cylinder of the filter tube, and a second connection flange connected to the first connection flange is provided at a bottom end of the outer cylinder, the guiding cone comprises a guiding cone body and a plurality of spiral blades provided around the guiding cone body along a circumferential direction, the guiding cone body has a big end down streamline shape and a bottom that is planar and securely disposed on a top end of the second cylinder, the guiding cone body has a bottom with a diameter that is the same as an outer diameter of the second cylinder of the filter tube, and the plurality of spiral blades have outer sides that are securely connected to an inner wall of the outer cylinder.

2. The filter tube for high temperature gas-solid separation according to claim 1, further comprising an angle between a tangential line at an uppermost end of each spiral blade and a horizontal line that is 90°, and further comprising an angle between a tangential line at a lowest end of each spiral blade and a horizontal line that is 0°~45°.

3. The filter tube for high temperature gas-solid separation according to claim 2, wherein the filter tube is a sintered metal filter tube.

4. The filter tube for high temperature gas-solid separation according to claim 1, further comprising an outer layer filtration membrane provided on an outer wall of the first cylinder, and an inner layer filtration membrane provided on an inner wall of the second cylinder, wherein the outer layer filtration membrane has a thickness larger than that of the inner layer filtration membrane.

5. The filter tube for high temperature gas-solid separation according to claim 4, wherein the filter tube is a sintered metal filter tube.

6. The filter tube for high temperature gas-solid separation according to claim 1, wherein the filter tube is a sintered metal filter tube.

7. A filter for high temperature gas-solid separation having a filtration unit which comprises at least one filter tube provided at a tube sheet of the filter, the tube sheet hermetically divides the filter into an upper clean gas chamber and a lower dusty gas chamber, an ejector and a pulse-jet pipeline corresponding to the ejector are provided above the filtration unit, the pulse-jet pipeline has one end that is communicated with a pulse-jet gas tank through a pulse-jet valve and another end that is provided with a nozzle opposite to a top of the ejector, wherein the filter tube comprises a first cylinder and a second cylinder coaxially nested in the first cylinder, wherein the first cylinder is arranged so that an opening thereof faces upward, a first connection flange is provided at a periphery of the opening of the first cylinder, and a circular through-hole is provided at a bottom of the first cylinder, the second cylinder is nested in the first cylinder so that an opening of the second cylinder faces downward, the second cylinder has an end at the opening that is hermetically connected to the circular through-hole of the first cylinder, the second cylinder has a bottom, and the bottom and the opening of the first cylinder are at the same horizontal level, and an annular gas passage is formed between the first cylinder and the second cylinder, wherein the filter tube has a top end with a pulse-jet guiding device securely provided thereon, the pulse-jet guiding device comprises an outer cylinder with both ends thereof being penetrated through, and a guiding cone secured in the outer cylinder, the outer cylinder has an inner diameter that is the same as an inner diameter of the first cylinder, a second connection flange is connected to the first connection flange of the filter tube at a bottom end of the outer cylinder, the guiding cone comprises a guiding cone body and a plurality of spiral blades provided around the guiding cone body along a circumferential direction, the guiding cone body has a big end down streamline shape, a bottom that is planar and securely disposed on a top end of the second cylinder, and the bottom of the guiding cone body has a diameter that is the same as an outer diameter of the second cylinder of the filter tube, the plurality of spiral blades have outer sides that are securely connected to an inner wall of the outer cylinder.

8. The filter for high temperature gas-solid separation according to claim 7, further comprising an angle between a tangential line at an uppermost end of each spiral blade and a horizontal line that is 90°, and further comprising an angle between a tangential line at a lowest end of each spiral blade and a horizontal line that is 0°~45°.

9. The filter tube for high temperature gas-solid separation according to claim 8, wherein the filter tube is a sintered metal filter tube.

10. The filter for high temperature gas-solid separation according to claim 7, further comprising an outer layer filtration membrane provided on an outer wall of the first cylinder, and an inner layer filtration membrane provided on an inner wall of the second cylinder, wherein the outer layer filtration membrane has a larger thickness than the inner layer filtration membrane.

11. The filter tube for high temperature gas-solid separation according to claim 10, wherein the filter tube is a sintered metal filter tube.

12. The filter tube for high temperature gas-solid separation according to claim 7, wherein the filter tube is a sintered metal filter tube.

\* \* \* \* \*